(12) United States Patent
Nagado (10) Patent No.: US 12,031,470 B2
(45) Date of Patent: Jul. 9, 2024

(54) CONTROL DEVICE, CONTROL METHOD, AND EXHAUST PURIFICATION SYSTEM

(71) Applicant: Komatsu Ltd., Tokyo (JP)

(72) Inventor: Yoshitoshi Nagado, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 18/272,641

(22) PCT Filed: Mar. 7, 2022

(86) PCT No.: PCT/JP2022/009765
§ 371 (c)(1),
(2) Date: Jul. 17, 2023

(87) PCT Pub. No.: WO2022/191138
PCT Pub. Date: Sep. 15, 2022

(65) Prior Publication Data
US 2024/0141814 A1      May 2, 2024

(30) Foreign Application Priority Data

Mar. 9, 2021 (JP) .................................. 2021-037402

(51) Int. Cl.
*F01N 3/20* (2006.01)
*B01D 53/94* (2006.01)

(52) U.S. Cl.
CPC ......... *F01N 3/208* (2013.01); *B01D 53/9418* (2013.01); *B01D 53/9495* (2013.01);
(Continued)

(58) Field of Classification Search
CPC ................. F01N 3/208; F01N 2610/02; F01N 2610/1453; F01N 2900/0408;
(Continued)

(56) References Cited

U.S. PATENT DOCUMENTS

| 2004/0083721 A1 | 5/2004 | Ketcher et al. |
| 2004/0083722 A1 | 5/2004 | Simpson et al. |
| 2017/0037799 A1* | 2/2017 | Balenovic .......... B01D 53/9477 |

FOREIGN PATENT DOCUMENTS

| JP | H06-000335 A | 1/1994 |
| JP | 2004-156614 A | 6/2004 |

(Continued)

*Primary Examiner* — Brandon D Lee
(74) *Attorney, Agent, or Firm* — Locke Lord LLP (57) ABSTRACT

There is provided a control device that controls an injection amount of a reducing agent to be supplied to a selective reduction catalyst provided in an exhaust passage of an internal combustion engine. The control device includes a pre-correction injection amount calculation unit configured to calculate a pre-correction injection amount of the reducing agent based on an operating state of the engine, and an injection amount correction unit configured to calculate a corrected injection amount obtained by correcting the pre-correction injection amount, based on a rate of change over time of a rotation speed of the engine and a rate of change over time of a fuel injection amount of the engine, such that the injection amount of the reducing agent increases when at least both the rate of change over time of the rotation speed and the rate of change over time of the fuel injection amount are positive.

10 Claims, 8 Drawing Sheets

(52) U.S. Cl.
CPC ........... *B01D 2251/2067* (2013.01); *B01D 2257/404* (2013.01); *B01D 2258/012* (2013.01); *F01N 2610/02* (2013.01); *F01N 2610/1453* (2013.01); *F01N 2900/0408* (2013.01); *F01N 2900/08* (2013.01); *F01N 2900/1402* (2013.01)

(58) Field of Classification Search
CPC ......... F01N 2900/08; F01N 2900/1402; B01D 53/9418; B01D 53/9495; B01D 2251/2067; B01D 2257/404; B01D 2258/012

See application file for complete search history.

(56) References Cited

FOREIGN PATENT DOCUMENTS

| | | | |
|---|---|---|---|
| JP | 2004-156615 | A | 6/2004 |
| JP | 2007-016713 | A | 1/2007 |
| JP | 2011-214494 | A | 10/2011 |

\* cited by examiner

| UREA WATER INJECTION AMOUNT CORRECTION COEFFICIENT | | FUEL INJECTION AMOUNT CHANGE RATE [mg/stroke/s] | | | | |
|---|---|---|---|---|---|---|
| | | 200 | 100 | 0 | -100 | -200 |
| ENGINE ROTATION SPEED CHANGE RATE [rpm/s] | 200 | 2.0 | 1.5 | 1 | 0.8 | 0.7 |
| | 100 | 1.8 | 1.4 | 1 | 0.8 | 0.7 |
| | 0 | 1.7 | 1.3 | 1 | 0.7 | 0.6 |
| | -100 | 1.6 | 1.2 | 1 | 0.6 | 0.5 |
| | -200 | 1.5 | 1.1 | 1 | 0.5 | 0.5 |

CONTROL DEVICE, CONTROL METHOD, AND EXHAUST PURIFICATION SYSTEM

TECHNICAL FIELD

The present invention relates to a control device, a control method, and an exhaust purification system. Priority is claimed on Japanese Patent Application No. 2021-037402, filed on Mar. 9, 2021, the content of which is incorporated herein by reference.

BACKGROUND ART

Patent Literature 1 discloses an exhaust purification control system as follows. That is, the exhaust purification control system disclosed in Patent Literature 1 includes a catalyst that is provided in an exhaust passage of an internal combustion engine to purify an exhaust gas, reactant supply means for supplying a reactant necessary for a reaction of the catalyst to an upstream side of the catalyst, and a control device that controls a supply amount of the reactant by the reactant supply means. Then, the control device performs a step of calculating a basic reactant supply amount from an operating condition of the internal combustion engine, a step of calculating a correction amount such that the correction amount decreases as an increase amount of an engine rotation speed increases, and a step of calculating a target reactant supply amount from the basic reactant supply amount and the correction amount. Further, the control device calculates the correction amount such that the correction amount increases as an increase amount of an opening degree of an accelerator increases.

In addition, Patent Literature 2 discloses a catalyst efficiency improving method as follows. That is, the catalyst efficiency improving method disclosed in Patent Literature 1 is a method for improving the efficiency of an NOx reduction catalyst connected to a downstream of an internal combustion engine. The catalyst efficiency improving method includes a step of detecting an acceleration that is about to occur in the internal combustion engine, and a step of adjusting a reducing agent injection amount to the NOx reduction catalyst in order to cause the acceleration of the internal combustion engine to cancel fluctuations that occur in a supply NOx amount of the internal combustion engine. In the catalyst efficiency improving method, parameters that enable quick display of an engine transition state such as a rate of change of a pedal position, a rate of change of a fuel injection amount, an engine speed, or a rate of change of a load are continuously monitored, and the injection amount of a reducing agent is continuously adjusted by using a function with such an engine transition state as parameters, in consideration of an increase or decrease in the amount of NOx entering the catalyst.

CITATION LIST

Patent Literature

[Patent Literature 1]
Japanese Unexamined Patent Application, First Publication No. 2011-214494

[Patent Literature 2]
Japanese Unexamined Patent Application, First Publication No. 2004-156615

SUMMARY OF INVENTION

Technical Problem

In the exhaust purification control system disclosed in Patent Literature 1, the correction amount is calculated to increase as the increase amount of the opening degree of the accelerator increases, and to decrease as the increase amount of the engine rotation speed increases. Thus, for example, when the increase amount of the opening degree of the accelerator is large and the increase amount of the engine rotation speed is large, there is a problem that the adjustment of the correction amount may be complicated.

In addition, the catalyst efficiency improving method disclosed in Patent Literature 2 does not show how to use a plurality of parameters for quickly displaying the engine transition state for the function for adjusting the injection amount of the reducing agent.

The present invention has been made in consideration of the above circumstances, and an object of the present invention is to provide a control device, a control method, and an exhaust purification system capable of solving the above problems and correcting an injection amount of a reducing agent with a simple configuration.

Solution to Problem

In order to solve the above problems, according to one aspect of the present invention, there is provided a control device that controls an injection amount of a reducing agent to be supplied to a selective reduction catalyst provided in an exhaust passage of an internal combustion engine. The control device includes a pre-correction injection amount calculation unit configured to calculate a pre-correction injection amount of the reducing agent based on an operating state of the internal combustion engine, and an injection amount correction unit configured to calculate a corrected injection amount obtained by correcting the pre-correction injection amount, based on a rate of change over time of a rotation speed of the internal combustion engine and a rate of change over time of a fuel injection amount of the internal combustion engine, such that the injection amount of the reducing agent increases when at least both the rate of change over time of the rotation speed and the rate of change over time of the fuel injection amount are positive, and the injection amount of the reducing agent decreases when at least both the rate of change over time of the rotation speed and the rate of change over time of the fuel injection amount are negative.

Further, according to another aspect of the present invention, there is provided a control method of controlling an injection amount of a reducing agent to be supplied to a selective reduction catalyst provided in an exhaust passage of an internal combustion engine. The control method includes a step of calculating a pre-correction injection amount of the reducing agent based on an operating state of the internal combustion engine, and a step of calculating a corrected injection amount obtained by correcting the pre-correction injection amount, based on a rate of change over time of a rotation speed of the internal combustion engine and a rate of change over time of a fuel injection amount of the internal combustion engine, such that the injection amount of the reducing agent increases when at least both the rate of change over time of the rotation speed and the rate of change over time of the fuel injection amount are positive, and the injection amount of the reducing agent decreases when at least both the rate of change over time of the rotation speed and the rate of change over time of the fuel injection amount are negative.

In addition, according to still another aspect of the present invention, there is provided an exhaust purification system that includes a selective reduction catalyst provided in an exhaust passage of an internal combustion engine, an injection device configured to inject a reducing agent to be supplied to the selective reduction catalyst, and a control device configured to control an injection amount of the reducing agent by the injection device. The control device includes a pre-correction injection amount calculation unit configured to calculate a pre-correction injection amount of the reducing agent based on an operating state of the internal combustion engine, and an injection amount correction unit configured to calculate a corrected injection amount obtained by correcting the pre-correction injection amount, based on a rate of change over time of a rotation speed of the internal combustion engine and a rate of change over time of a fuel injection amount of the internal combustion engine, such that the injection amount of the reducing agent increases when at least both the rate of change over time of the rotation speed and the rate of change over time of the fuel injection amount are positive, and the injection amount of the reducing agent decreases when at least both the rate of change over time of the rotation speed and the rate of change over time of the fuel injection amount are negative.

Advantageous Effects of Invention

According to each aspect of the present invention, it is possible to correct the injection amount of the reducing agent with a simple configuration.

DESCRIPTION OF EMBODIMENTS

Figure 1:
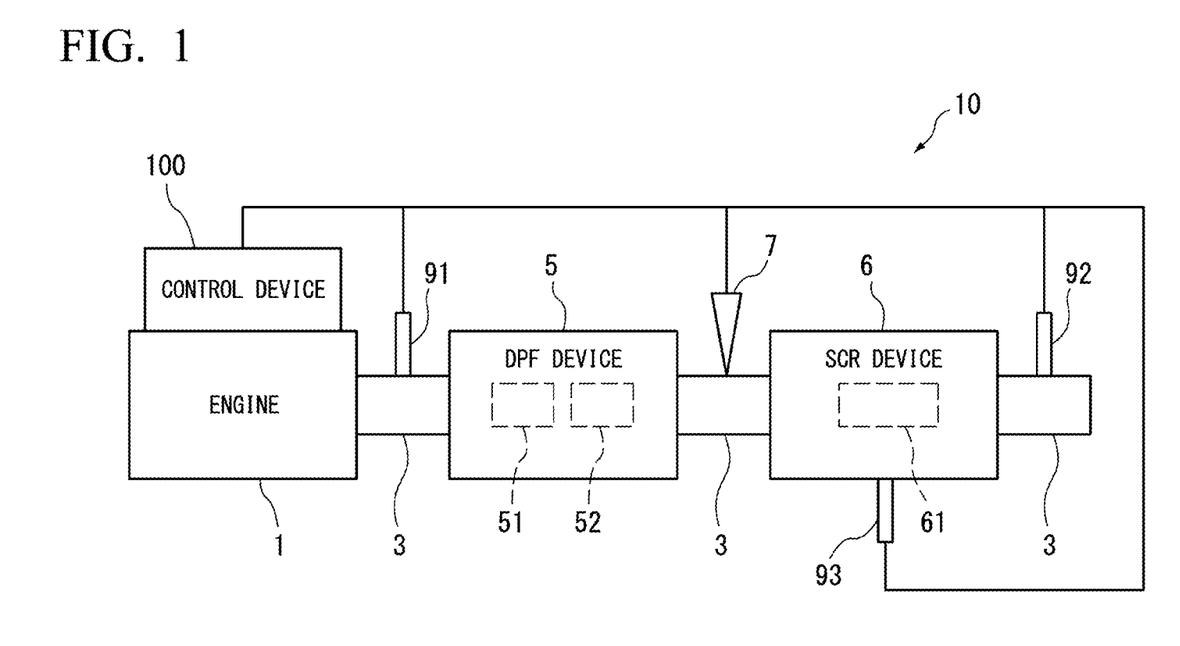
FIG. 1 is a system diagram representing a configuration example of an exhaust purification system according to an embodiment of the present invention.
Figure 2:
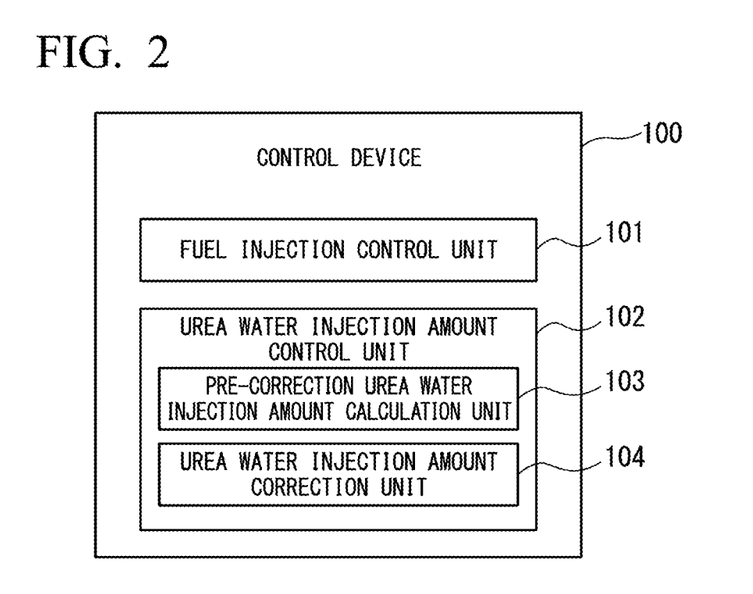
FIG. 2 is a block diagram representing a configuration example of a control device 100 represented in FIG. 1.
Figure 3:
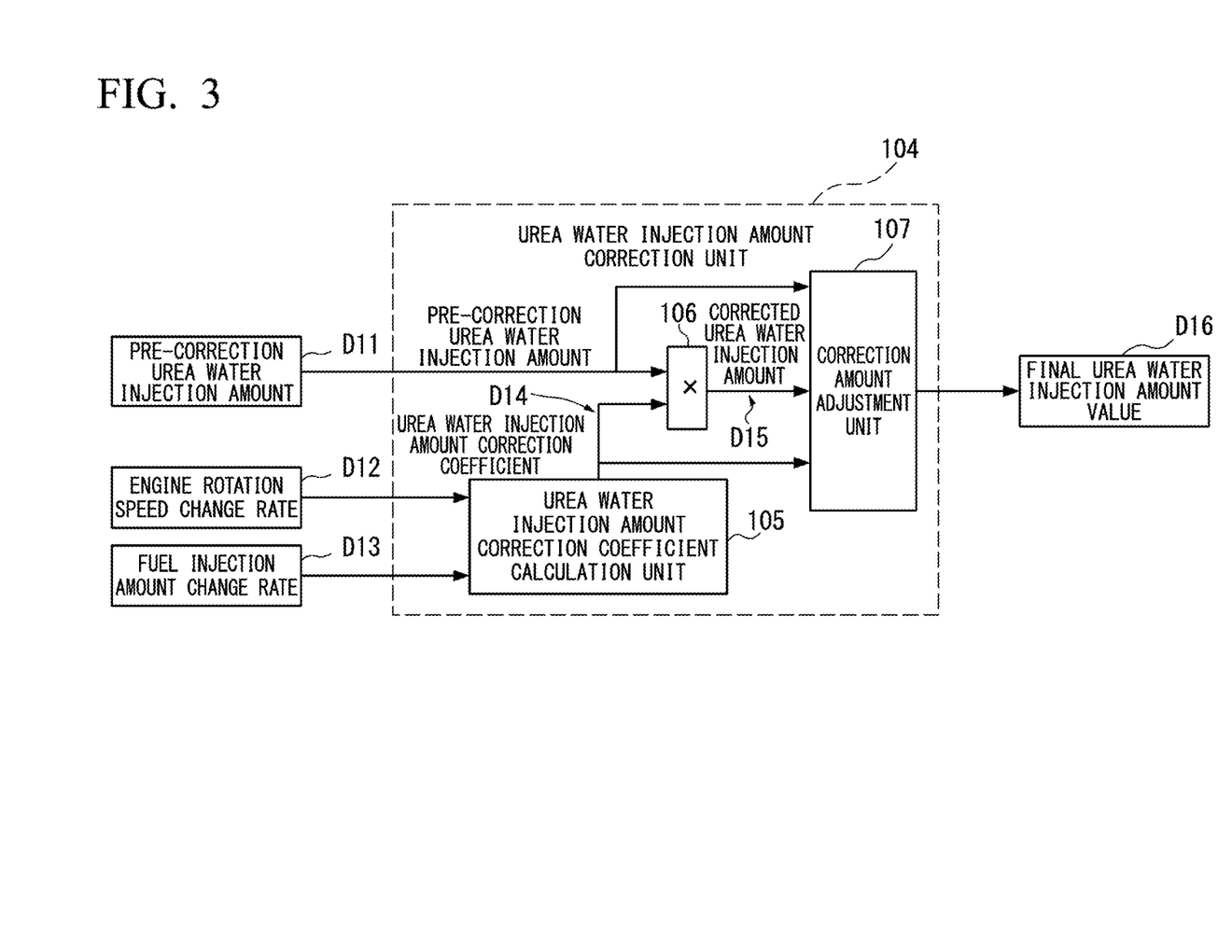
FIG. 3 is a block diagram representing a configuration example of a urea water injection amount correction unit 104 represented in FIG. 2.
Figure 4:
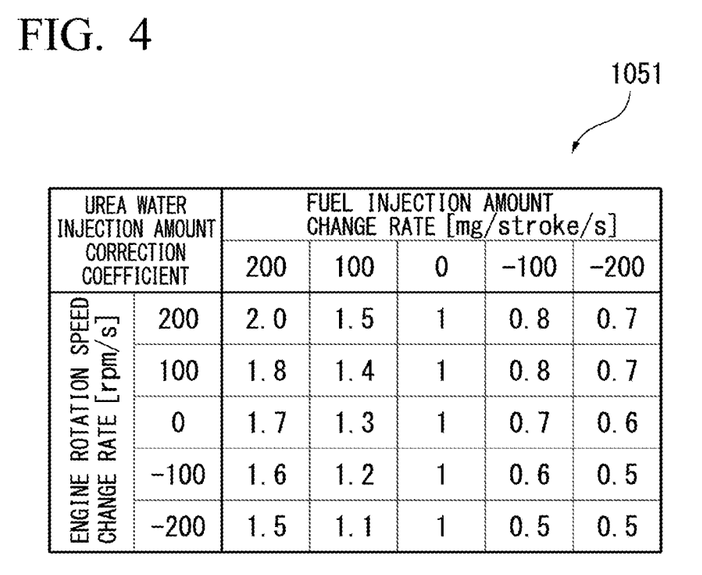
FIG. 4 is a schematic diagram for explaining a configuration example of a urea water injection amount correction coefficient calculation unit 105 represented in FIG. 3.
Figure 5:
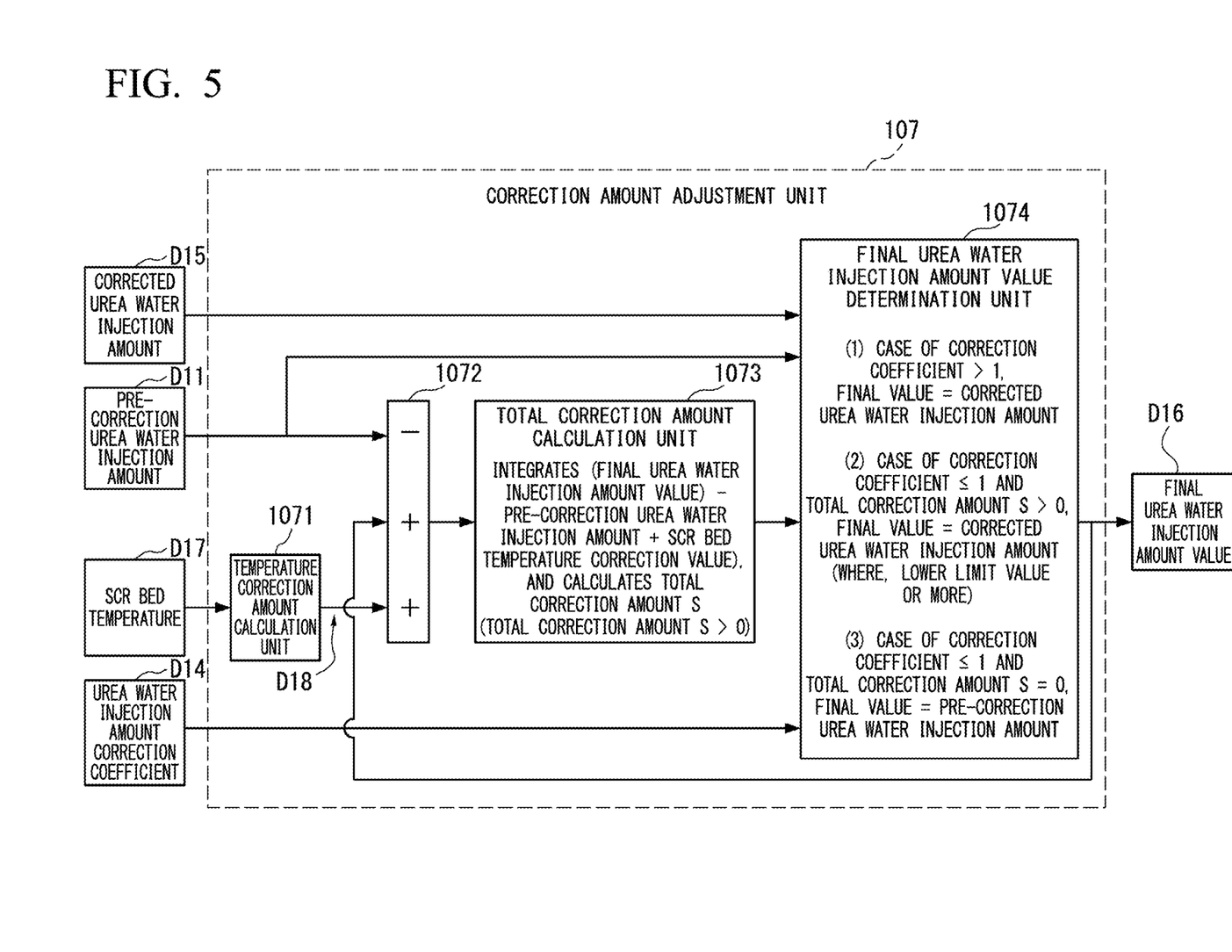
FIG. 5 is a block diagram representing a configuration example of a correction amount adjustment unit 107 represented in FIG. 3.
Figure 6:
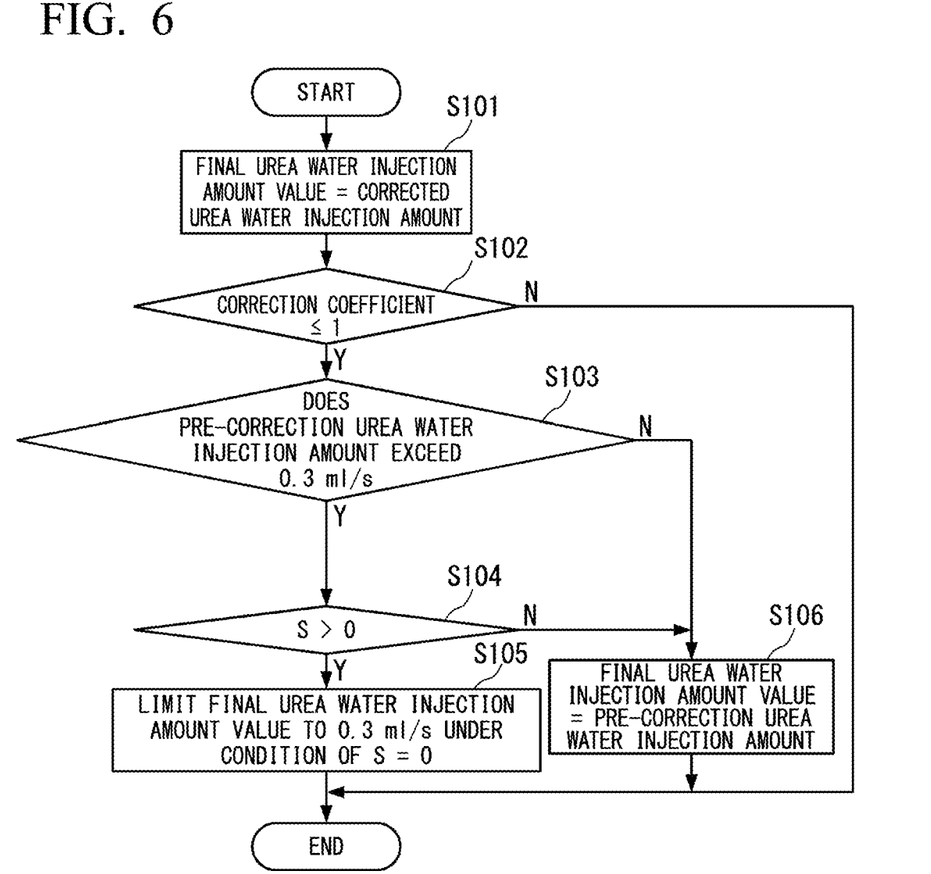
FIG. 6 is a flowchart representing an operation example of the correction amount adjustment unit 107 represented in FIG. 5.
Figure 7:
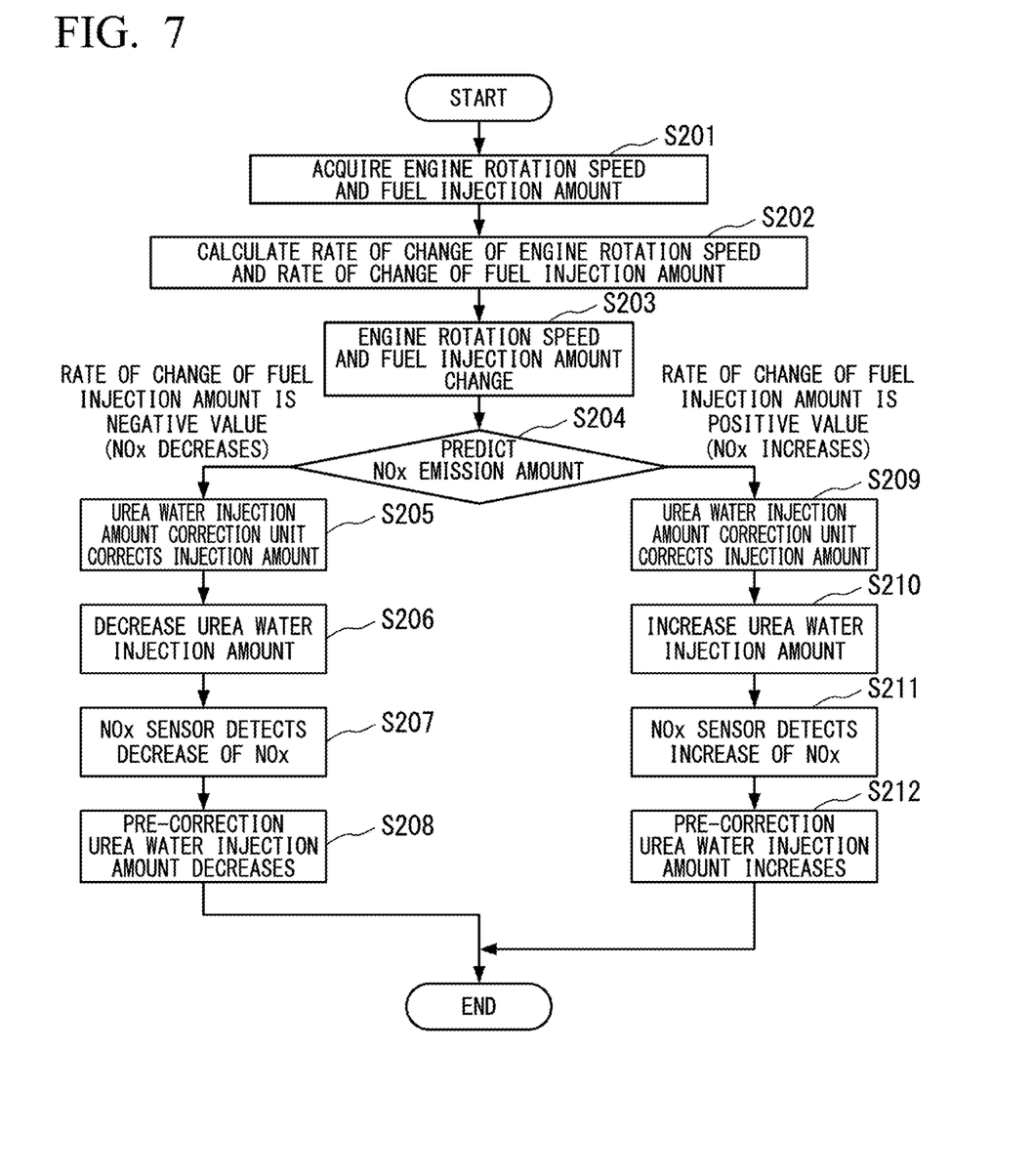
FIG. 7 is a flowchart representing an operation example of an exhaust purification system 10 represented in FIG. 1.
Figure 8:
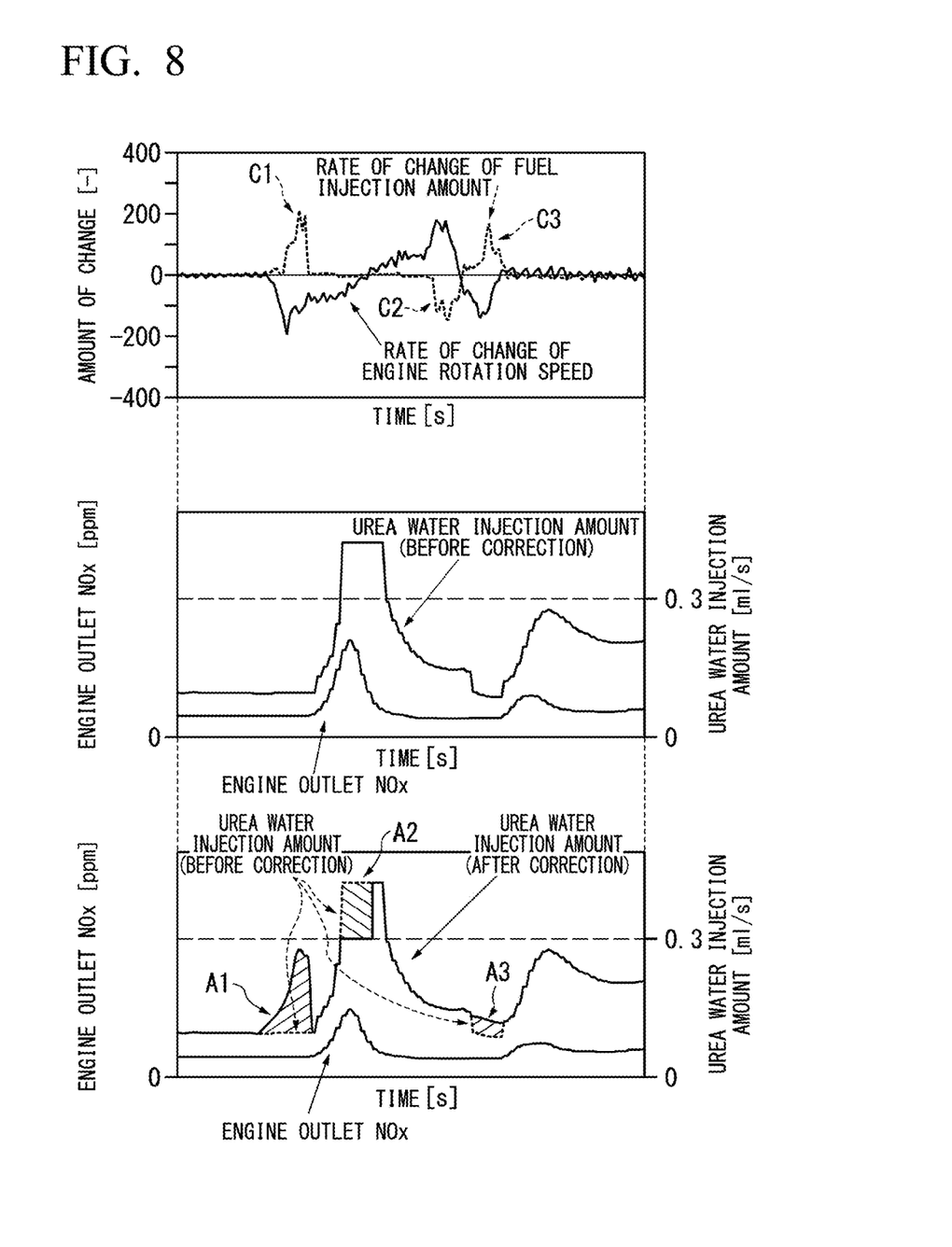
FIG. 8 is a schematic diagram representing an operation example of the exhaust purification system 10 represented in FIG. 1.

Hereinafter, an embodiment of the present invention will be described with reference to the drawings. In each figure, the same reference signs are used for the same or corresponding configurations, and the description thereof will be omitted as appropriate. FIG. 1 is a system diagram representing a configuration example of an exhaust purification system according to an embodiment of the present invention. FIG. 2 is a block diagram representing a configuration example of a control device 100 represented in FIG. 1. FIG. 3 is a block diagram representing a configuration example of a urea water injection amount correction unit 104 represented in FIG. 2. FIG. 4 is a schematic diagram for explaining a configuration example of a urea water injection amount correction coefficient calculation unit 105 represented in FIG. 3. FIG. 5 is a block diagram representing a configuration example of a correction amount adjustment unit 107 represented in FIG. 3. FIG. 6 is a flowchart representing an operation example of the correction amount adjustment unit 107 represented in FIG. 5. FIG. 7 is a flowchart representing an operation example of an exhaust purification system 10 represented in FIG. 1. FIG. 8 is a schematic diagram representing an operation example of the exhaust purification system 10 represented in FIG. 1.

Configuration Example of Exhaust Purification System 10

FIG. 1 represents a configuration example of the exhaust purification system 10 according to the embodiment of the present invention. The exhaust purification system represented in FIG. 1 includes an engine 1, an exhaust passage 3, a DPF device 5, an SCR device 6, a urea water injector 7, an engine outlet NOx (nitrogen oxide) sensor 91, an SCR outlet NOx sensor 92, an SCR bed temperature sensor 93, and the control device 100. The exhaust purification system 10 according to the present embodiment includes at least the SCR device 6, the urea water injector 7, and the control device 100. FIG. 1 mainly represents a configuration related to injection amount control of the urea water injector 7 in the exhaust purification system 10 or the control device 100 in the present embodiment. The drawing of a configuration related to other functions such as fuel injection control of the engine 1 will be omitted as appropriate.

The engine 1 is a configuration example of an internal combustion engine and is a multi-cylinder diesel engine in the present embodiment. The exhaust passage 3 is provided for exhausting the exhaust of the engine 1 to the atmosphere through the DPF device 5 and the SCR device 6.

The DPF device 5 is, for example, a continuous regeneration type DPF system. The DPF device 5 includes a diesel oxidation catalyst (DOC) 51 and a diesel particulate filter (DPF) 52 therein. The DPF 52 collects particulate matters (PM) and oxidizes the PM collected downstream with nitride dioxide converted by the DOC 51 to obtain carbon dioxide. In this manner, the DPF device 5 removes the PM. The DPF device 5 may be another type of system such as an automatic regeneration type DPF system or a manual regeneration type DPF system.

The SCR device 6 includes a selective catalytic reduction (SCR; ammonia selective reduction catalyst) 61 therein. The SCR device 6 converts nitrogen oxides (NOx) into nitrogen molecules (N2) and water (H2O) by urea water which is supplied into the exhaust on the upstream side of the SCR 61 by the urea water injector 7 and is an example of a reducing agent. The reducing agent may be anhydrous urea or the like.

The urea water injector 7 is an injection device that injects urea water to be supplied to the SCR 61 in the SCR device 6. The control device 100 controls the injection amount of the urea water injected into the exhaust passage 3 by the urea water injector 7.

The engine outlet NOx sensor 91 is a sensor that detects a NOx concentration in the vicinity of an exhaust outlet of the engine 1 in the exhaust passage 3, and outputs a signal indicating a detection result to the control device 100. The SCR outlet NOx sensor 92 is a sensor that detects a NOx concentration in the vicinity of an exhaust outlet of the SCR device 6 in the exhaust passage 3, and outputs a signal indicating a detection result to the control device 100. The engine outlet NOx sensor 91 and the engine outlet NOx sensor 92 are used, for example, when an effect of reducing NOx by the SCR 61 and the like is calculated by comparing measured values of the sensors with each other. The SCR bed temperature sensor 93 measures a catalyst bed temperature of the SCR 61 in the SCR device 6 and outputs a result of the measurement to the control device 100. The SCR bed temperature sensor 93 may be configured by a plurality of temperature sensors. In this case, for example, an average value of a plurality of measured values or the like can be used as the catalyst bed temperature.

The control device 100 repeatedly receives inputs of analog signals or digital signals output from a plurality of sensors including the engine outlet NOx sensor 91, the SCR outlet NOx sensor 92, the SCR bed temperature sensor 93, an engine rotation sensor (not represented) that detects a rotation speed of the engine 1, a pedal operation amount sensor (not represented) that detects an operation amount of an accelerator pedal. In addition, the control device 100 performs fuel injection control by using a plurality of injectors provided in the engine 1, controls various motors and valves, and controls the injection amount of the urea water injector 7.

(Control Device 100)

The engine control device 100 represented in FIG. 1 can be configured by using, for example, a computer such as a microcomputer, and peripheral circuits and peripheral devices of the computer. The control device 100 includes a plurality of blocks represented in FIG. 2, as functional configuration configured by a combination of hardware such as the computer and software such as a program executed by the computer. FIG. 2 represents a functional configuration related to injection amount control of the urea water injector 7 among a plurality of functional configurations provided in the control device 100. The control device 100 represented in FIG. 2 includes a fuel injection control unit 101 and a urea water injection amount control unit 102. In addition, the urea water injection amount control unit 102 includes a pre-correction urea water injection amount calculation unit 103 and a urea water injection amount correction unit 104.

The fuel injection control unit 101 performs fuel injection control, for example, by controlling a fuel injection device (not represented) of the engine 1. The fuel injection control unit 101 outputs information indicating the rotation speed of the engine 1, a fuel injection amount, or the like to the urea water injection amount control unit 102.

The urea water injection amount control unit 102 controls the injection amount of the urea water by the urea water injector 7, by using, as a target value, a final urea water injection amount value D16 (FIG. 3) output in a manner that the urea water injection amount correction unit 104 corrects and adjusts a pre-correction urea water injection amount D11 (FIG. 3) calculated by the pre-correction urea water injection amount calculation unit 103.

The pre-correction urea water injection amount calculation unit 103 predicts, for example, a NOx emission amount based on the operating state of the engine 1, and calculates the pre-correction urea water injection amount D11 which is a reference value of the target value for the injection amount of the urea water. In the present embodiment, information representing the operating state of the engine 1 is information representing a plurality of parameters used when the amount of NOx contained in an exhaust gas of the engine 1 is calculated (estimated). Such information is, for example, the rotation speed of the engine 1, a cooling water temperature, a suction temperature, the catalyst bed temperature of the SCR 61 in the SCR device 6, the fuel injection amount, a fuel injection period, the detection result of the engine outlet NOx sensor 91, the detection result of the SCR outlet NOx sensor 92, and the like. In the present embodiment, it is assumed that the information indicating the operating state of the engine 1 includes at least detection information of the engine outlet NOx sensor 91 (or the SCR outlet NOx sensor 92) that detects the NOx concentration in the exhaust passage 3. The pre-correction urea water injection amount calculation unit 103 may calculate (estimate) the amount of NOx contained in the exhaust gas of the engine 1 without using the detection results of the engine outlet NOx sensor 91 and the SCR outlet NOx sensor 92.

The urea water injection amount correction unit (injection amount correction unit) 104 calculates the corrected injection amount by correcting the pre-correction injection amount calculated by the pre-correction urea water injection amount calculation unit 103 based on the rate of change over time (time differential value, also simply referred to as a change rate) of the rotation speed of the engine 1 and the rate of change over time of the fuel injection amount of the engine 1. At this time, the urea water injection amount correction unit 104 calculates the corrected injection amount by correcting the pre-correction injection amount such that the injection amount of the urea water increases when at least both the rate of change over time of the rotation speed and the rate of change over time of the fuel injection amount are positive, and the injection amount of the urea water decreases when at least both the rate of change over time of the rotation speed and the rate of change over time of the fuel injection amount are negative. In addition, the urea water injection amount correction unit 104 may adjust the corrected injection amount such that an integrated value of a difference between the pre-correction injection amount and the corrected injection amount is zero. Further, the urea water injection amount correction unit 104 may adjust the corrected injection amount to be equal to or more than a predetermined lower limit value in a case where the injection amount of the urea water is reduced.

FIG. 3 represents the configuration example of the urea water injection amount correction unit 104 represented in FIG. 2. The urea water injection amount correction unit 104 represented in FIG. 3 includes a urea water injection amount correction coefficient calculation unit 105, a multiplier 106, and a correction amount adjustment unit 107. The urea water injection amount correction unit 104 receives inputs of the pre-correction urea water injection amount D11, an engine rotation speed change rate D12, and a fuel injection amount change rate D13, and calculates a corrected urea water injection amount D15 by correcting the pre-correction urea water injection amount D11. Further, the urea water injection amount correction unit 104 adjusts the corrected urea water injection amount D15 and outputs the result of the adjustment as the final urea water injection amount value D16. The urea water injection amount correction unit 104 calculates the final urea water injection amount value D16 by adjusting the corrected urea water injection amount D15 such that the final urea water injection amount value D16 becomes any one of the pre-correction urea water injection amount D11, the corrected urea water injection amount D15, and the predetermined lower limit value (set to 0.3 ml/s in the following example).

The urea water injection amount correction coefficient calculation unit 105 calculates a urea water injection amount correction coefficient D14 by using, for example, a table (or map) 1051 represented in FIG. 4. Further, the multiplier 106 calculates the corrected urea water injection amount D15 by multiplying the pre-correction urea water injection amount D11 by the urea water injection correction amount coefficient D14. In the table 1051 represented in FIG. 4, the fuel injection amount change rate [mg/stroke/s] and the engine rotation speed change rate [rpm/s] are used as parameters, and each value of the urea water injection correction amount coefficient D14 corresponding to each combination of the fuel injection amount change rate and the engine rotation speed change rate is defined. Here, a case where the fuel injection amount change rate has a positive value means an increase of the fuel injection amount change rate, and a case where the fuel injection amount change rate has a negative value means a decrease of the fuel injection amount change rate. A case where the engine rotation speed change rate has a positive value means an increase of the engine rotation speed, and a case where the engine rotation speed change rate has a negative value means a decrease of the engine rotation speed.

Using the table 1051 represented in FIG. 4, for example, the urea water injection amount correction coefficient calculation unit 105 calculates the urea water injection correction amount coefficient D14 to "2.0" when the fuel injection amount change rate is 200 [mg/stroke/s] and the engine rotation speed change rate is 200 [rpm/s]. Further, for example, the urea water injection amount correction coefficient calculation unit 105 calculates the urea water injection correction amount coefficient D14 to "0.5" when the fuel injection amount change rate is −200 [mg/stroke/s] and the engine rotation speed change rate is −200 [rpm/s]. When the urea water injection correction amount coefficient D14 is "1", the pre-correction urea water injection amount D11 is equal to the corrected urea water injection amount D15. When the urea water injection correction amount coefficient D14 is more than "1", the corrected urea water injection amount D15 is more than the pre-correction urea water injection amount D11 (correction to increase). When the urea water injection correction amount coefficient D14 is less than "1", the corrected urea water injection amount D15 is less than the pre-correction urea water injection amount D11 (correction to decrease).

In addition, the table 1051 corresponds to the following tendencies. That is, a case where the fuel injection amount increases indicates that the load is increasing, and an increase in NOx flowing into the SCR 61 can be predicted. Conversely, when the fuel injection amount decreases, a decrease in NOx can be predicted. Further, when there is no change in the fuel injection amount, no correction is performed. As the rotation speed increases, the absolute amount of NOx increases. It can be supposed that the absolute amount of NOx decreases as the rotation speed decreases.

In addition, the correspondence relationship between the combination of the fuel injection amount change rate and the engine rotation speed change rate, and the urea water injection correction amount coefficient D14 can be set based on the results of experiments on an actual machine or based on simulation results using a model, or the like.

When the table 1051 represented in FIG. 4 is used, the urea water correction coefficient D14 is calculated by comparison to the pre-correction urea water injection amount D11 such that the corrected urea water injection amount D15 increases when at least both the rate of change over time of the rotation speed and the rate of change over time of the fuel injection amount are positive, and the corrected urea water injection amount D15 decreases when at least both the rate of change over time of the rotation speed and the rate of change over time of the fuel injection amount are negative. Further, when the table 1051 represented in FIG. 4 is used, the urea water correction coefficient D14 is calculated by comparison to the pre-correction urea water injection amount D11 such that the corrected urea water injection amount D15 increases when the rate of change over time of the fuel injection amount is positive, and the corrected urea water injection amount D15 decreases when the rate of change over time of the fuel injection amount is negative.

The table 1051 is an example, and for example, the range of each rate of change may be subdivided. Alternatively, the multiplier 106 may calculate the corrected urea water injection amount D15 based on each rate of change in a state where the value of the urea water correction coefficient D14 is subjected to interpolating processing.

Next, the correction amount adjustment unit 107 represented in FIG. 3 will be described. As represented in FIG. 5, for example, the correction amount adjustment unit 107 includes a temperature correction value calculation unit 1071, an adder 1072, a total correction amount calculation unit 1073, and a final urea water injection amount value determination unit 1074. The correction amount adjustment unit 107 represented in FIG. 5 receives inputs of the corrected urea water injection amount D15, the pre-correction urea water injection amount D11, an SCR bed temperature D17, and a urea water injection amount correction coefficient D14, calculates the final urea water injection amount value D16, and outputs the calculated final urea water injection amount value D16. The example represented in FIG. 5 is different in that the correction amount adjustment unit 107 newly receives the input of the SCR bed temperature D17 as compared with the correction amount adjustment unit 107 represented in FIG. 3.

The temperature correction value calculation unit 1071 calculates, based on the SCR bed temperature D17, a correction value (referred to as an SCR bed temperature correction value D18) when the integrated value of an adsorption amount of ammonia of SCR 61 is calculated based on the saturated adsorption amount curve of the SCR 61. The saturated adsorption amount curve is a curve representing the maximum value of the ammonia adsorption amount of the SCR 61 at each temperature (for example, Japanese Unexamined Patent Application, First Publication No. 2010-261388). The SCR bed temperature correction value D18 is a correction value for calculating the integrated value of the adsorption amount of ammonia not to exceed the saturated adsorption amount, when such an integrated value is calculated. The SCR bed temperature correction value D18 takes, for example, zero, a positive value, or a negative value with a certain temperature as a reference.

The adder 1072 calculates (final urea water injection amount value D16)−(pre-correction urea water injection amount D11)+(SCR bed temperature correction value D18), and outputs the result of the calculation to the total correction amount calculation unit 1073.

The total correction amount calculation unit 1073 calculates the total correction amount S by integrating {(final urea water injection amount value D16)− (pre-correction urea water injection amount D11)+(SCR bed temperature correction value D18)}. The total correction amount S is a value obtained in a manner that correction with the SCR bed temperature correction value D18 is applied to a difference of the final urea water injection amount value D16 from the pre-correction urea water injection amount D11, and then integral is performed. The total correction amount S is a value corresponding to the amount of ammonia estimated to be accumulated in the SCR 61, by a difference of the corrected injection amount from the pre-correction urea water injection amount D11 as the reference. The total correction amount calculation unit 1073 limits the value of the total correction amount S to be more than 0.

The total correction amount calculation unit 1073 integrates the amount increased by the correction from the urea water injection amount of the base as being positive. At this time, (corrected urea water injection amount D15)−(pre-correction urea injection amount D11) takes a positive or negative value. Further, in a case of reducing the amount, for example, when the injection amount is limited to 0.3 ml/s or more, the amount is reduced from the base urea water injection amount, so that the total correction amount S also decreases.

The total correction amount calculation unit 1073 may use the SCR bed temperature correction value D18 as an upper limit value of the total correction amount S. In this case, the temperature correction value calculation unit 1071 calculates and outputs, based on the SCR bed temperature D17, the upper limit value when the integrated value of an adsorption amount of ammonia of SCR 61 is calculated based on the saturated adsorption amount curve of the SCR 61, as the SCR bed temperature correction value (upper limit value) D18. The SCR bed temperature correction value D18 output by the temperature correction value calculation unit 1071 is not input to the adder 1072, but is input to the total correction amount calculation unit 1073. Further, the adder 1072 calculates (final urea water injection amount value D16)−(pre-correction urea water injection amount D11), and outputs the result of the calculation to the total correction amount calculation unit 1073. Then, the total correction amount calculation unit 1073 calculates the total correction amount S (where S>0) by integrating {(final urea water injection amount value D16)−(pre-correction urea water injection amount D11)} with the SCR bed temperature correction value D18 as the upper limit value.

The final urea water injection amount value determination unit 1074 receives the inputs of the corrected urea water injection amount D15, the pre-correction urea water injection amount D11, the total correction amount S, and the urea water injection amount correction coefficient D14, makes the total injection amount not change by correction with respect to the urea water injection amount (pre-correction urea water injection amount D11) as the reference, and makes the injection amount not fall below a predetermined lower limit value by correction in a decrease direction. Thus, the final urea water injection amount value determination unit 1074 calculates and outputs the final urea water injection amount value D16 by adjusting the corrected urea water injection amount D15 (by not setting the value of the corrected urea water injection amount D15 itself as the final urea water injection amount value D16, but setting the value of the corrected urea water injection amount D15 to a value varying depending on conditions).

For example, when the SCR bed temperature correction value D18 is within a predetermined range, the final urea water injection amount value determination unit 1074 can calculate the final urea water injection amount value D16 by adjusting the corrected urea water injection amount D15 such that the integrated value of the difference between the pre-correction urea water injection amount D11 (pre-correction injection amount) and the corrected urea water injection amount D15 (corrected injection amount) is zero. Alternatively, for example, when the injection amount of urea water is reduced, the urea water injection amount correction unit 104 can calculate the final urea water injection amount value D16 by adjusting the corrected urea water injection amount D15 to be equal to or more than the predetermined lower limit value.

The final urea water injection amount value determination unit 1074 calculates the final urea water injection amount value D16, for example, in the cases (1) to (3) as follows. (1) In the case of the urea water injection amount correction coefficient D14 (correction coefficient)>1, the final urea water injection amount value D16 (final value) is set to the corrected urea water injection amount D15. (2) In the case of the urea water injection amount correction coefficient D14≤1 and the total correction amount S>0, the final urea water injection amount value D16 is set to the corrected urea water injection amount D15 (the minimum value is set to the predetermined lower limit value (for example, 0.3 ml/s)). (3) In the case of the urea water injection amount correction coefficient D14≤1 and the total correction amount S=0, the final urea water injection amount value D16 is set to the pre-correction urea water injection amount D11.

FIG. 6 represents an operation example of the final urea water injection amount value determination unit 1074. In the operation example represented in FIG. 6, first, the final urea water injection amount value determination unit 1074 temporarily sets the final urea water injection amount value D16 to the corrected urea water injection amount D15 (Step S101). Then, the final urea water injection amount value determination unit 1074 determines whether or not the urea water injection amount correction coefficient D14 is equal to or less than 1 (Step S102). When the urea water injection amount correction coefficient D14 is more than 1 (case of "N" in Step S102), the final urea water injection amount value determination unit 1074 ends the processing represented in FIG. 6. In this case, the final urea water injection amount value D16 is the corrected urea water injection amount D15.

On the other hand, when the urea water injection amount correction coefficient D14 is equal to or less than 1 (case of "Y" in Step S102), the final urea water injection amount value determination unit 1074 determines whether or not the pre-correction urea water injection amount D11 exceeds the lower limit value (0.3 ml/s) (Step S103). When the pre-correction urea water injection amount D11 does not exceed the lower limit value (0.3 ml/s) (case of "N" in Step S103), the final urea water injection amount value determination unit 1074 sets the final urea water injection amount value D16 to the pre-correction urea water injection amount D11 (Step S106). Then, the processing represented in FIG. 6 is ended. In this case, the final urea water injection amount value D16 is the pre-correction urea water injection amount D11.

On the other hand, when the pre-correction urea water injection amount D11 exceeds the lower limit value (0.3 ml/s) (case of "Y" in Step S103), the final urea water injection amount value determination unit 1074 determines whether or not the total correction amount S is more than 0 (Step S104). When the total correction amount S is more than 0 (case of "Y" in Step S104), the final urea water injection amount value determination unit 1074 limits the final urea water injection amount value D16 to 0.3 ml/s under a condition of the total correction amount S=0 (Step S105). Then, the processing represented in FIG. 6 is ended. In this case, the final urea water injection amount value D16 is the corrected urea water injection amount D15 or 0.3 ml/s in a range of the total correction amount S>0.

On the other hand, in the case of the total correction amount S=0 (case of "N" in Step S104), the final urea water injection amount value determination unit 1074 sets the final urea water injection amount value D16 to the pre-correction urea water injection amount D11 (Step S106). Then, the processing represented in FIG. 6 is ended. In this case, the final urea water injection amount value D16 is the pre-correction urea water injection amount D11.

As described above, the control device 100 in the present embodiment controls the injection amount of urea water (reducing agent) to be supplied to the SCR 61 (selective reduction catalyst) provided in the exhaust passage 3 of the engine 1 (internal combustion engine). The control device 100 includes the pre-correction injection amount calculation unit 103 that calculates the pre-correction urea water injection amount D11 (pre-correction injection amount) based on the operating state of the engine 1, and the urea water injection amount correction unit 104 (injection amount correction unit) that calculates the corrected urea water injection amount D15 obtained by correcting the pre-correction urea water injection amount D11, based on the rate of change over time of the rotation speed of the engine 1 (engine rotation speed change rate D12) and the rate of change over time of the fuel injection amount of the engine 1 (fuel injection amount change rate D13) such that the injection amount of urea water increases when at least both the engine rotation speed change rate D12 and the fuel injection amount change rate D13 are positive, and the injection amount of urea water decreases when at least both the engine rotation speed change rate D12 and the fuel injection amount change rate D13 are negative. According to the present embodiment, with a simple configuration, it is possible to correct the injection amount of urea water even when the increase amount of the fuel injection amount is large and the increase amount of the engine rotation speed is large.

Further, the urea water injection amount correction unit 104 (injection amount correction unit 104) can further adjust the corrected urea water injection amount D15 such that the integrated value of the difference between the pre-correction urea water injection amount D11 and the corrected urea water injection amount D15 is zero. According to this configuration, it is possible to make the injection amounts of urea water before and after correction be equal to each other. Further, according to the present embodiment, regarding the pre-correction urea water injection amount D11, even when the total amount of the injection amount for a predetermined period is optimized by the system, it is possible to maintain the optimization at the corrected injection amount.

Further, the urea water injection amount correction unit 104 (injection amount correction unit) can further adjust the corrected urea water injection amount Dl 5 to be equal to or more than the predetermined lower limit value, when the injection amount of urea water is decreased.

Operation Example of Exhaust Purification System 10

Next, the operation example of the exhaust purification system 10 will be described with reference to FIG. 7. The operation represented in FIG. 7 is repeated at a predetermined cycle. In the operation represented in FIG. 7, first, the control device 100 (for example, the urea water injection amount control unit 102) acquires the engine rotation speed and the fuel injection amount (for example, from the fuel injection amount control unit 101) (Step S201). Then, the control device 100 (for example, the urea water injection amount control unit 102) calculates the rate of change of the engine rotation speed and the rate of change of the fuel injection amount (Step S202). Here, the rotation speed of the engine 1 and the fuel injection amount change (S203).

Then, the pre-correction urea water injection amount calculation unit 103 predicts the NOx emission amount and calculates the pre-correction urea water injection amount D11 (Step S204). In Step S204, when the rate of change of the fuel injection amount is a negative value (NOx decreases), and the urea water injection amount correction unit 104 corrects the injection amount (Step S205), the urea water injection amount is decreased (Step S206). When the urea water injection amount is decreased, the engine outlet NOx sensor 91 detects the decrease in NOx (Step S207). Thus, the pre-correction urea water injection amount D11 decreases (Step S208).

On the other hand, in Step S204, when the rate of change of the fuel injection amount is a positive value (NOx increases), and the urea water injection amount correction unit 104 corrects the injection amount (Step S209), the urea water injection amount is increased (Step S210). When the urea water injection amount is increased, the engine outlet NOx sensor 91 detects the increase in NOx (Step S211). Thus, the pre-correction urea water injection amount D11 increases (Step S212).

FIG. 8 represents a control example of the urea water injection amount according to the present embodiment. In order from the top, FIG. 8 represents the change over time of the rate of change of the fuel injection amount, the rate of change of the engine rotation speed, the change over time of the measurement result of the engine outlet NOx sensor 91 and the urea water injection amount (before correction), and the change over time of the measurement result of the engine outlet NOx sensor 91 and the urea water injection amount (after correction). The urea water injection amount (after correction) increases by an amount of an area A1 shaded with diagonal lines corresponding to an increase C1 in the rate of change of the fuel injection amount. Then, when the urea water injection amount (before correction) exceeds the lower limit value of 0.3 ml/s, the urea water injection amount (after correction) decreases to the lower limit value of 0.3 ml/s by the amount of an area A2. The area A2 is equal to the area A1. In this case, since the injection amount of urea water is suppressed from the maximum value to the lower limit value of 0.3 ml/s, it is possible to shorten the time for the urea water injection amount to reach the maximum value, and to suppress an occurrence of a risk that a urea precipitate is deposited inside the exhaust passage.

On the other hand, regarding the decrease C2 in the rate of change of the fuel injection amount, the value of the fuel injection amount (before correction) falls below the lower limit value (0.3 ml/s). Thus, the urea water injection amount (after correction) does not change from the fuel injection amount (before correction).

On the other hand, regarding an increase C3 in the rate of change of the fuel injection amount, the urea water injection amount (after correction) increases by an amount corresponding to an area A3.

As described above, according to the present embodiment, for example, (1) by calculating the change in NOx from the rate of change of the engine rotation speed and the rate of change of the fuel injection amount, it is possible to change the urea injection amount before the NOx sensor installed at the outlet of the engine detects the change in NOx in the exhaust gas. As a result, it is possible to cover the delay time until the NOx sensor detects the change in the amount of NOx in the exhaust gas, and thus, it is possible to increase the degree of freedom regarding the installation location of the NOx sensor.

Further, even when the urea injection amount is changed, the NOx sensor detects the change in NOx in the exhaust gas, so that the control device increases the urea injection amount. In this case, by subtracting the amount of the urea water injection amount increased in (1) above, it is possible to reduce the amount of urea per unit of the exhaust gas, and thus it is possible to reduce the occurrence of a risk that the urea precipitate is deposited inside the exhaust passage.

Hitherto, the embodiment of the present invention has been described with reference to the drawings. However, a specific configuration is not limited to the above-described embodiment, and includes a design change within the scope not departing from the concept of the present invention. For example, in FIG. 3, the correction amount adjustment unit 107 may be omitted and the corrected urea water injection amount D15 may be set as the final urea water injection amount value D16. Alternatively, in FIG. 5, the temperature correction value calculation unit 1071 or the total value correction amount calculation unit 1073 may be omitted, and the case classification based on the total correction amount S in the final urea water injection amount value determination unit 1074 may be omitted.

In addition, programs executed by a computer in the above-described embodiment can be partially or entirely distributed via a computer-readable recording medium or a communication line.

INDUSTRIAL APPLICABILITY

According to each aspect of the present invention, it is possible to correct the injection amount of the reducing agent with a simple configuration.

REFERENCE SIGNS LIST

1: Engine (internal combustion engine)
3: Exhaust passage
5: DPF device
51: DOC
52: DPF
6: SCR device
61: SCR
7: Urea water injector (injection device)
10: Exhaust purification system
91: Engine outlet NOx sensor
92: SCR outlet NOx sensor
93: SCR bed temperature sensor
100: Control device
101: Fuel injection control unit
102: Urea water injection amount control unit
103: Pre-correction urea water injection amount calculation unit
104: Urea water injection amount correction unit

What is claimed is:

1. A control device that controls an injection amount of a reducing agent to be supplied to a selective reduction catalyst provided in an exhaust passage of an internal combustion engine, the control device comprising:
a pre-correction injection amount calculation unit configured to calculate a pre-correction injection amount of the reducing agent based on an operating state of the internal combustion engine; and
an injection amount correction unit configured to calculate a corrected injection amount obtained by correcting the pre-correction injection amount, based on a rate of change over time of a rotation speed of the internal combustion engine and a rate of change over time of a fuel injection amount of the internal combustion engine, such that the injection amount of the reducing agent increases when at least both the rate of change over time of the rotation speed and the rate of change over time of the fuel injection amount are positive, and the injection amount of the reducing agent decreases when at least both the rate of change over time of the rotation speed and the rate of change over time of the fuel injection amount are negative.

2. The control device according to claim 1, wherein the injection amount correction unit is further configured to adjust the corrected injection amount such that an integrated value of a difference between the pre-correction injection amount and the corrected injection amount is zero.

3. The control device according to claim 1, wherein the injection amount correction unit is further configured to adjust the corrected injection amount to be equal to or more than a predetermined lower limit value when the injection amount of the reducing agent is decreased.

4. The control device according to claim 1, wherein information representing the operating state includes at least detection information of a sensor configured to detect a concentration of nitrogen oxides in the exhaust passage.

5. The control device according to claim 2, wherein the injection amount correction unit is further configured to adjust the corrected injection amount to be equal to or more than a predetermined lower limit value when the injection amount of the reducing agent is decreased.

6. The control device according to claim 2, wherein information representing the operating state includes at least detection information of a sensor configured to detect a concentration of nitrogen oxides in the exhaust passage.

7. The control device according to claim 3, wherein information representing the operating state includes at least detection information of a sensor configured to detect a concentration of nitrogen oxides in the exhaust passage.

8. The control device according to claim 5, wherein information representing the operating state includes at least detection information of a sensor configured to detect a concentration of nitrogen oxides in the exhaust passage.

9. A control method of controlling an injection amount of a reducing agent to be supplied to a selective reduction catalyst provided in an exhaust passage of an internal combustion engine, the control method comprising:
a step of calculating a pre-correction injection amount of the reducing agent based on an operating state of the internal combustion engine; and
a step of calculating a corrected injection amount obtained by correcting the pre-correction injection amount, based on a rate of change over time of a rotation speed of the internal combustion engine and a rate of change over time of a fuel injection amount of the internal combustion engine, such that the injection amount of the reducing agent increases when at least both the rate of change over time of the rotation speed and the rate of change over time of the fuel injection amount are positive, and the injection amount of the reducing agent decreases when at least both the rate of change over time of the rotation speed and the rate of change over time of the fuel injection amount are negative.

10. An exhaust purification system comprising:
a selective reduction catalyst provided in an exhaust passage of an internal combustion engine;
an injection device configured to inject a reducing agent to be supplied to the selective reduction catalyst; and
a control device configured to control an injection amount of the reducing agent by the injection device, wherein the control device includes
a pre-correction injection amount calculation unit configured to calculate a pre-correction injection amount of the reducing agent based on an operating state of the internal combustion engine, and
an injection amount correction unit configured to calculate a corrected injection amount obtained by correcting the pre-correction injection amount, based on a rate of change over time of a rotation speed of the internal combustion engine and a rate of change over time of a fuel injection amount of the internal combustion engine, such that the injection amount of the reducing agent increases when at least both the rate of change over time of the rotation speed and the rate of change over time of the fuel injection amount are positive, and the injection amount of the reducing agent decreases when at least both the rate of change over time of the rotation speed and the rate of change over time of the fuel injection amount are negative.

* * * * *